United States Patent [19]

Gold

[11] 4,167,109

[45] Sep. 11, 1979

[54] PROCESS FOR MEASURING TEMPERATURE WITH SOLID STATE TRACK RECORDERS

[76] Inventor: Raymond Gold, 1982 Greenbrook Blvd., Richland, Wash. 99352

[21] Appl. No.: 917,903

[22] Filed: Jun. 22, 1978

[51] Int. Cl.² .................... G01N 25/00; G01T 5/00
[52] U.S. Cl. .................... 73/15 R; 73/339 R; 250/473; 252/408
[58] Field of Search .............. 73/339 R, 355 R, 15 R; 250/472, 473; 252/408

[56] References Cited

U.S. PATENT DOCUMENTS

| | | | |
|---|---|---|---|
| 2,978,584 | 4/1961 | Loconti et al. | 250/472 X |
| 3,065,345 | 11/1962 | LeClerc | 250/472 X |
| 3,186,228 | 6/1965 | Lever et al. | 73/362 R |
| 3,373,683 | 3/1968 | Alter | 250/472 X |
| 3,529,157 | 9/1970 | Johnston et al. | 250/472 X |
| 3,612,870 | 10/1971 | Brennan | 250/473 |
| 3,821,895 | 7/1974 | Sumikawa et al. | 73/355 R X |
| 3,839,898 | 10/1974 | Talboom, Jr. | 73/339 R X |

Primary Examiner—Daniel M. Yasich

[57] ABSTRACT

Small passive solid state track recorders used for measuring radiation, functionally change physical characteristics of latent radiation tracks when subjected to higher temperature thermal environs, during or after radiation. These changes in physical characteristics of the latent radiation tracks may be observed and compared to known standards to determine some thermal history and especially measure of attained temperature of the solid state track recorder.

5 Claims, 8 Drawing Figures

PROCESS FOR MEASURING TEMPERATURE WITH SOLID STATE TRACK RECORDERS

BACKGROUND OF INVENTION

A. RELATED APPLICATIONS

There are no prior applications related hereto filed in this or any foreign country.

B. FIELD OF INVENTION

My invention relates generally to measurement of thermal activity by passive sensors and more particularly to measurement of attained temperature by determination of thermally induced changes of latent tracks in irradiated solid state track recorders.

C. DESCRIPTION OF PRIOR ART

Solid state track recorders, commonly known as SSTR's, have been used for several years past to detect nuclear radiation of the particle type. When radiation impinges upon the surface of such device it causes physical change or damage at the impingement site such that the irradiated sites will react differently to chemical or physical changes than the non-irradiated part of the SSTR. The irradiated SSTR is processed, commonly by chemical etching, to differentiate the radiation damage sites which then become so called 'tracks' that may be optically sensed by optical or electron microscopy. Solid state track recorders have become increasingly sophisticated and a plurality of various types and forms of such devices are presently commercially available.

The known solid state track recorders are formed of some solid substance, commonly a crystal, glass or plastic. All of these materials react predicatably by way of various physical and chemical changes responsive to their thermal condition and particularly attained temperature and temperature duration. My invention provides a method or process for using this thermal reaction of SSTR's to sense and indicate their thermal history. Such devices then become relatively small, passive thermal indicators and measuring devices.

Various passive thermal monitors and sensors of one sort or another have heretofore become known especially for use in extremely adverse environs such as in nuclear reactors, in close proximity to nuclear blasts, and in metallurgical furnaces, kilns, fire chambers and the like. Such devices commonly depend upon some consistently predictable, temperature related, thermally caused change in the sensing device. Banet et al., U.S. Pat. No. 3,124,685 photographically senses a relative small beam of impinging radiation; Talboom, U.S. Pat. No. 3,839,898, senses crystal structure of interrelating layered materials; Ambrose, U.S. Pat. No. 3,965,724, senses passage of liquid through a permeable membrane. The instant invention provides another member of this broad general class of passive thermal sensors that determine, at least, maximum attained temperature and oftentimes temperature duration or other thermal historicity. The instant invention differs from the other known members of this class of devices by the particular material from which the sensor is formed, the thermally changed characteristics that are sensed, the specific method of sensing these characteristics and the methods of their measuration.

SUMMARY OF INVENTION

My invention generally provides a process for determining thermal history including at least maximum attained temperature, of a solid state radiation track recorder to indicate the condition of its environs.

To carry out my process I select an SSTR type that will have appropriate reaction in the thermal range within which measuration is to be had. A group of SSTR's of this type is then pre-irradiated to create substantially identical track densities in each and a part of the members of this group are exposed to known thermal conditions and processed to create a standard that functionally relates physical and chemical reactions to causative thermal conditions to establish a measurement standard. The remaining group of measuring sensors are then placed as passive sensing devices in the environ to be measured and there exposed to the thermal conditions of that environ. After appropriate exposure the measuring sensors are retrieved, appropriately processed by etching or other means in a fashion identical to that used for the standard sensors and the reactions of the measuring sensors then compared with the reactions of the standard test sensors to determine the desired thermal historicity.

Various sophistications such as pre-irradiation with particular particles or rays according to the sensitivity of a particular sensor, time related irradiation, radiation beam collimation, radiation at various angles and similar techniques may be used to increase sensitivity and determine more details of thermal history. Similarly the process of irradiation may be carried out during thermal exposure by means of an associated source of radiation. The processing techniques of the exposed recorders may be varied and various characteristics of radiation impingement sites may be measured such as size, shape, radius, areal density or chemical reactivity.

In creating such a process it is:

A principal object of my invention to provide a passive, thermal sensor, for use expecially in hostile environs to measure thermal historicity, including at least maximum attained temperature of the sensor by determining thermally caused and functionally related physical and chemical changes at radiation impingement sites of a solid state track recorder.

A further object of my invention to provide such a passive thermal sensing device that is entirely self contained, does not require personal attendance or maintenance after installation, is a unitary structure that does not require moving parts, requires no power for operation, is simple to construct from economic, non-critical materials and will permit thermal monitoring without substantial perturbation of the environment under observation.

A further object of my invention to provide such a process that is operative with a wide variety of solid state track recording materials to allow measurement of temperatures over a range extending at least between 100 and 1000 degrees centigrade.

A still further object of my invention to provide such a process that may be used both in environs that are subject to radiation and in those that are radiation free.

A further object of my invention to provide such a process that may provide historical information of variation of temperature of a particular sensor.

A still further object of my invention to provide such a process that is new, novel, unique, simple, economic of operation and otherwise well suited to the purposes for which it is intended.

Other and further objects of my invention will appear from the following specification and accompanying drawings which form a part hereof. In carrying out the objects of my invention, however, it is to be understood that its essential features are susceptible of change, especially in accidental features, design and ordering, with only a preferred and practical embodiment being specified as required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

Figure 2:
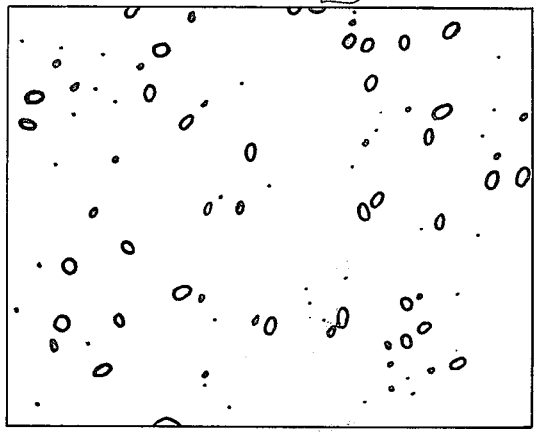
FIG. 2 is a somewhat idealized drawings of a photomicrograph of an unannealed etched solid state track recorder showing sites of radiation impingement.

Radiation detectors of various sorts have long been known. They have progressed from original simplistic cloud chambers to sophisticated multipurpose measuring monitors of the present day. The so called solid state track recorder has become known and widely used for radiation detection and measurement in the last few years and many types and forms of the device have become commercially available.

In general the solid state track recorder provides a relatively small mass of some substance upon which radiation to be sensed or measured impinges. Generally most charged particle radiation of various sorts can be detected by solid state track recorders under appropriate conditions. Uncharged particles commonly will not create a sensible damage site at the point of their impingence upon the ordinary solid state track recorder but with appropriate convertors secondary charged particle radiation may be generated thereby so that ultimately the radiation uncharged particles may also generally be detected.

Electromagnetic radiation generally is not directly detectable by SSTR's of the type with which my invention is involved. The material of which the solid state track recorder is formed is of such nature that upon impingement of radiation the impingement site is changed either physically, chemically or in both fashions such that the area of impingement, or 'damage site' as it is called in the art, will react differently than the other surface area of the solid state track recorder to various physical and chemical processes. Commonly when irradiated solid state track recorders are chemically etched with appropriate etchants and processes, the radioactive damage sites will prove much more susceptible to the etching process than other areas of the recorder so as to form pits, that in the art are commonly called 'tracks' at or about the radiation damage site.

The exact manner of processing an irradiated solid state track recorder to make radiation damage sites distinguishable varies with the type of recorder, the nature of radiation involved and the information desired. Generally, however, a chemical etching process of some sort is used to differentially etch pits or indentations at and about the damage radiation impingement sites to render them observable and distinguishable from the other portions of an SSTR. Commonly radiation damage sites even after etching are relatively small and must generally be observed with aid of a microscope, either optical or electronic. It is possible that the etching process may be carried far enough to provide tracks that can be observed by the unaided eye but this is not common nor generally practicable.

The materials from which solid state track recorders are made vary widely but commonly they are of dielectric nature and for simple use with optical microscopes they are preferably transparent. Many materials are crystalline in structure though relatively amorphous materials such as glasses, amber and various plastics are used for such devices. Materials in common use for recorders include natural and artificial glass, and certain plastics such as polycarbonates (lexan, makrobol), cellulose nitrate and cellulose acetate. The etching processes involved with each of these materials are somewhat different depending upon the chemical nature of the particular material involved, but all depend upon a different chemical resistivity of radiation damage sites as compared to that of the undamaged material. Commonly the chemical attack causing etching will be from a solvent, though various chemical reactions will also serve the same purpose, the radiation damage sites generally being more reactive than the normal or unaltered material. Various materials which may be used for solid state radiation detectors are well known and well described in the nuclear arts as are the processes for treating those materials by etching or otherwise to make radiation tracks distinguishable.

All of the known solid state track recorders whether crystalline or amorphous demonstrate a track fading or disappearance by reason of annealing when the irradiated material is subjected to appropriate elevated temperatures. My process is primarily concerned with the annealing of radiation damage sites prior to etching or other processing of the thermally exposed SSTR's. Undoubtedly though the same principles could be applied by processing irradiated SSTR's and subsequently exposing them to the thermal environs to be measured, though the results might not be as consistant, or accurate or sensitive. In general the annealing process is a gradual one and for any particular track recorder extends over a period of time and a range of temperature, the limits of both of which are dependent upon the particular material of which that recorder is formed. As time and temperature increase to allow greater annealing, a particular track or damage site will gradually become smaller and will eventually disappear. In gross, over an area of solid state recorder, as temperature and time of thermal activity increase the total number of observable tracks will decrease as a function of either time or temperature individually or both together and similarly the size of tracks will decrease.

The changes in tracks or damage sites responsive to thermal conditions of solid state track recorders may be used to measure the thermal conditions causing the changes. The density distribution of tracks may be used as such a measure, as may their size, shape or most any discernable physically or chemically changed characteristic. The preferable measure is the areal density of observable tracks in a particular recorder. The identity of several materials commonly used in present day solid state track recorders and their track annealing ranges are set forth in the following TABLE I.

TABLE I

FISSION TRACK ANNEALING CHARACTERISTICS OF SELECTED SSTR MATERIALS

| Material | 1 Hour Annealing Temperature (°C.) | | |
|---|---|---|---|
| | Total Fading | 50% Track Loss | Start of Track Loss |
| Amber (Baltic) | — | 110 | — |
| Apatite | 375–530 | 322–336 | 275–400 |
| Aragonite (CaCO$_3$) | 150 | — | 130 |
| Autunite | 60 | — | 40 |
| Barysilite | — | 440 | — |
| Calcite (CaCO$_3$) | — | 200 | — |
| Cellulose acetate (Cellit-T) | 165 | 160 | 100 |
| Cellulose nitrate | — | 85 | — |
| fission fragments | 147 | 140 | 110 |
| alpha particles | 138 | 130 | 110 |
| Epidote | 715 | 650–680 | 575 |
| Feldspar (Albite) | 775 | — | — |
| Feldspar (Anorhite) | 680 | 550 | 350 |
| Feldspar (Bytownite) | 790 | 750 | 690 |
| Garnet | 690 | 665 | 560 |
| Glass: | | | |
| Aluminosilicate corning 1720 | 500 | 320 | 100 |
| Andesitic impact glass | 250 | — | 190 |
| Basaltic, tachylitic impact glasses | — | 190–225 | — |
| Basaltic | 240 | 190 | 140 |
| Basaltic tholeitic | 300 | 275 | 280 |
| Borosilicate pyrex | 380 | 275–302 | — |
| Feldspathic | 235 | — | 200 |
| Libyan desert, 98% SiO$_2$ | 570 | 460 | 330–335 |
| Obsidian | — | 390 | — |
| Obsidian, .3% H$_2$O | — | 262 | — |
| Obsidian, .8% H$_2$O | — | 250 | — |
| Obsidian, 2.2% H$_2$O | — | 190 | — |
| Ryolite | — | 262 | — |
| Phosphate | 300 | — | 150 |
| Pitchstone | — | 450 | — |
| Silica | 500 | 290 | 100 |
| Soda lime | 370 | 190 | — |
| NBS Soda lime | — | 230 | 110 |
| Australian tektite | 510 | 380 | 225 |
| Bediastie tektite | 490–510 | 360–370 | 220–335 |
| Indochina tektite | | | |
| 1 atm | — | 500 | — |
| 10 kbar | — | 360 | — |
| 60 kbar | — | 100 | — |
| V$_2$O$_5$, 5P$_2$O$_5$ | — | 95 | — |
| Hardystonite | — | 450 | — |
| Hornblende | 630–750 | 590–720 | 530–650 |
| Mica (Muscovite) | 540–700 | 510–670 | 275–550 |
| Mica (Phlogopite) | 550 | — | 350 |
| Monazite | — | 300 | — |
| Mullite | 270(±130) | 525(±25) | 625(±75) |
| Nasonite | 450 | — | — |
| Olivine | 500 | — | — |
| Pollucite | — | 670 | — |
| Polycarbonate (Lexan) | 185 | — | — |
| Makrofol | 200 | 190 | 100 |
| Pyroxene: | | | |
| Augite | 560 | 480 | 300 |
| Diopside | 880 | 850 | 820 |
| Enstatite | — | 450 | — |
| Hypersthene | 475–600 | 330± | 300–525 |
| Pigeonite | 530 | — | 500 |
| Quartz (SiO$_2$) | 1050 | — | 1000 |
| Sphene: | | | |
| (HCL etch) | 637 | 620 | 520 |
| (NaOH etch) | 780 | 740 | 680 |
| Zircon: | | | |
| (1 atm) | — | 700 | — |
| (80 kbar) | — | 675 | — |

From the foregoing TABLE I it is apparent that the annealing characteristics of the several materials there listed vary considerably. Generally passive temperature monitoring according to my invention may be accomplished with these materials in a temperature range of below 100 degrees centigrade to approximately 900 degrees centigrade by selecting appropriate solid state track recorders and using appropriate processing.

Figure 3:
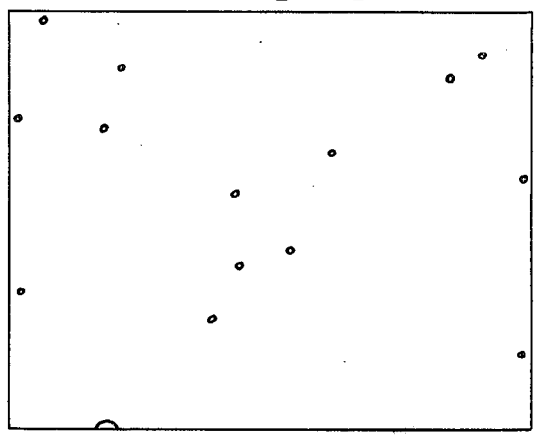
FIG. 3 is a drawing similar to that of FIG. 2 and of the same material except that the sample has been sufficiently annealed, prior to etching, to show the effects of the annealing process.
Figure 1:
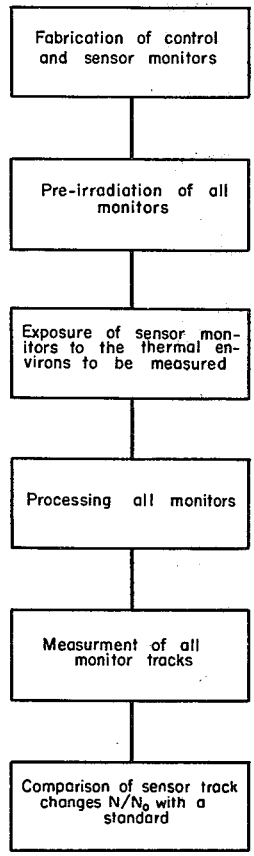
FIG. 1 is a flow diagram showing the several steps of my process.
Figure 4:
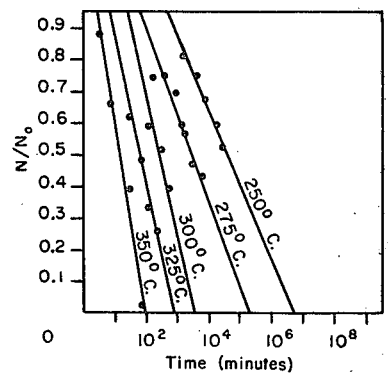
FIG. 4 is a graph showing the experimental results of fission track annealing in apatite.
Figure 5:
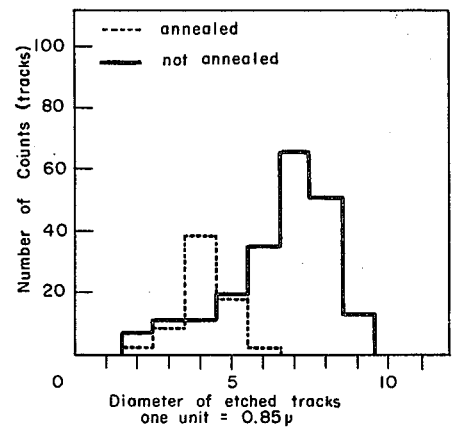
FIG. 5 is a histiogram showing diameter distributions of fission tracks in a glass solid state track recorder before and after annealing.

The drawings of FIG. 2 and FIG. 3 show the general nature of solid state track recorder tracks and the effects of annealing thereon. FIG. 2 is a black and white drawing rather literally copied from a photo-micrograph of tracks in an unannealed specimen of a quartz glass solid state track recorder. FIG. 3 is a similar literal drawings of a second photo-micrograph of the same quartz glass recorder at the same magnification (260x) after having been annealed at 400 degrees centigrade for 64 hours prior to processing. The affect of annealing upon track density, size and shape is apparent and typical.

My invention provides the method or process of using thermal annealing properties of irradiated solid state track recorders to create passive temperature monitoring devices. The process comprises:

1. Selection of an appropriate solid state track recording material, compatible with the thermal conditions and environment under observation, with subsequent fabrication of the required number or group of monitors, including a control set and a sensor set of appropriate and identical size, form and shape therefrom.
2. Pre-irradiation of all the group of monitors, including both the set of sensors and the set of controls, so that all possess a substantially statistically identical density of similar radiation tracks.
3. Exposure of the set of sensor SSTR's for a predetermined period of time at the elevated temperature of the environment under observation. During this time the control set of SSTR's will be maintained at a temperature below that causing any annealing reaction in them.
4. Retrieval of the sensor set of SSTR's from the environment under observation and processing of both sensing and the control sets of SSTR's, preferably simultaneously, under the same conditions to render then existing radiation tracks observable.
5. Measurement of at least one of the physical characteristics of the observable radiation tracks in both the sensor and the control sets of SSTR's. Commonly the characteristics measured will be areal density of the tracks or track size.

6. Determination of the change in physical characteristics of the sensor group of solid state track recorders compared to the control group and by comparison to this change with a standard calibration scale, determination of the attained temperature of the sensor group of recorders.

A standard calibration scale for any particular type of SSTR is determined by subjecting a number of the same solid state track recording devices to known temperatures and determining changes of physical characteristics at those temperatures as compared to the same physical characteristics at a null temperature. To create such a standard calibration scale a number (n+s) of identical solid state track recorders is identically pre-irradiated to establish statistically identical radiation tracks therein. The group s which may be one or more such SSTR's is the standard null group of control samples and is maintained at or below the null temperature at which no annealing of tracks in the particular SSTR material occurs. Each of the members of the n group are then subjected to and maintained at predetermined calibration temperatures $t_1$, $t_2$, $t_3$ . . . $t_n$ respectively for predetermined, normally equal periods of time. The calibration temperatures $t_1$, $t_2$, $t_3$ . . . $t_n$ should all be stable during the period of exposure of recorders and should be accurately known to provide consistent results. The various thermally treated recorders are then retrieved, thereafter maintained below the null temperature, and processed, preferably simultaneously, with the control group s of SSTR's under identical conditions. Observation of track densities $N_o$ in the control group s and $N_1$, $N_2$, $N_3$ . . . $N_n$ in the thermally exposed group or of other track characteristics such as particular dimension $D_1$, $D_2$, $D_3$ . . . $D_n$ if desired, is made for each recorder exposed at a particular temperature. Relative densities or dimensions are then determined for tracks at each temperature with respect to the track density $N_o$ or track characteristics $D_o$ of the control specimens s. These relative track densities will then become $N_1/N_o$, $N_2/N_o$, . . . $N_n/N_o$ indicating the relative density at each temperature $t_1$, $t_2$, $t_3$ . . . $t_n$ respectively. These relative track densities then are functionally related, commonly by graphing, to the respective temperatures $t_1$, $t_2$, $t_3$ . . . $t_n$ and a smooth curve established through the points $[N_1/N_o, t_1]$. . . $[N_n/N_o, t_n]$. This curve may be smoothed by any of the recognized statistical methods, but preferably by least squares averaging. The curve when determined will then provide the desired standard calibration scale. Other measurable physical characteristics may be similarly used for comparison in the same fashion. A particular track dimension or the relationship of dimensions (which would tend to indicate shape) have been found to be especially useful as comparable physical characteristics. By comparing the relative physical characteristics of tracks in solid state track recorders exposed to a particular temperature with a control sample, maintained below a null temperature, the relationship when related to a standard calibration curve will substantially determine the maximum temperature to which that particular solid state track recorder had been subjected, so long as the times and manner of thermal exposure of the samples is substantially the same. Two specific examples of the process follow:

EXAMPLE I: QUARTZ GLASS

A group of 16 cylindrical quartz glass SSTR's about 2.0 cm. in diameter by 2 mm thick were all pre-irradiated with uncollimated fission fragments. Preirradiations were carried out by successively placing each of the 16 quartz glass SSTR's in surface contact with the same spontaneous fission source for identical time intervals. After this pre-irradiation, one control specimen was set aside and kept at room temperature. The remaining 15 quartz glass SSTR's were subjected to known elevated temperatures for known time periods. These conditions are summarized in TABLE II. Each quartz glass SSTR was exposed for a unique time (either 1.5, 3.0, or 6.0 hours) at a unique temperature (either 275, 325, 375, 425 or 475° C.).

TABLE II

| QUARTZ GLASS CALIBRATION CONDITIONS | |
|---|---|
| Time (Hours) | Temperatures in Degrees Centrigrade (t) |
| 1.5 | 275, 325, 375, 425, and 475 |
| 3.0 | 275, 325, 375, 425, and 475 |
| 6.0 | 275, 325, 375, 425 and 475 |

The 15 thermally exposed quartz glass SSTR's together with the control specimen were simultaneously etched in an aqueous solution of 48% Hydrofluoric acid (HF) at room temperature for five minutes. After etching, all SSTR's were scanned by optical microscopy to observe the track density N and the track shape characteristics D. Examples of uncollimated fission tracks in quartz glass have already been displayed in FIGS. 2 and 3. As can be seen in these Figures, uncollimated fission tracks in quartz glass are generally elliptical in shape, except when fission fragments enter the quartz glass surface at near normal incidence when the tracks be circular in shape. Consequently for this quartz glass calibration, the track shape characteristic D was chosen to be the semi-minor axis of the elliptical tracks.

Figure 6:
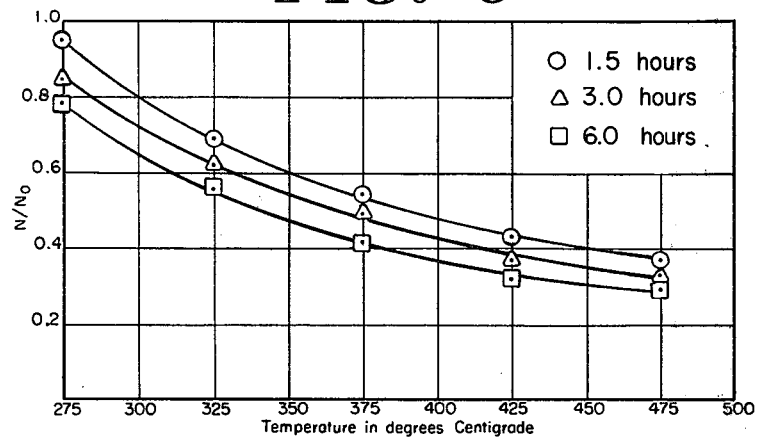
FIG. 6 is a diagram of the functional relationship of track density to attained temperature in an exemplary quartz glass SSTR.
Figure 7:
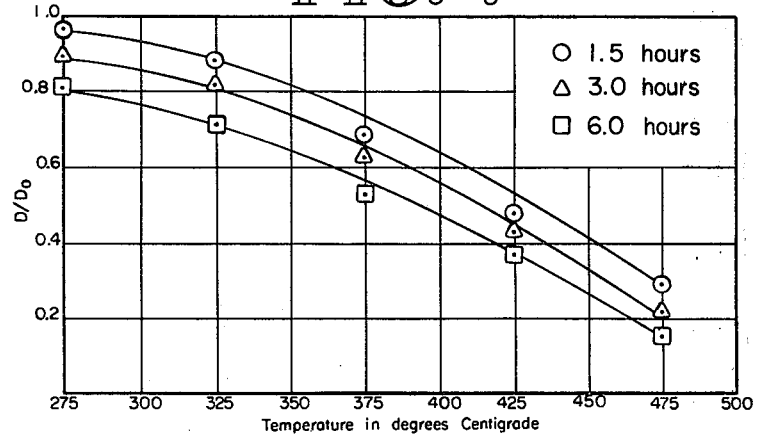
FIG. 7 is a diagram of the functional relationship of semi-minor axis diameters of tracks to attained temperature in the same quartz glass material as is the subject of FIG. 6.

The results of optical microscopic scanning of the SSTR's are presented in FIGS. 6 and 7, which display the relative track density $N/N_o$ and the relative semi-minor axis ratios $D/D_o$, respectively for each temperature $t_n$. Here $N_o$ and $D_o$ are the track density and semi-minor axis of the control specimens, respectively. This calibration data furnishes an appropriate standard calibration scale which can be subsequently used in applications of quartz glass SSTR as passive temperature monitors.

EXAMPLE II: MICA

A group of 19 cylindrical mica SSTR's about 1.6 cm. diameter by 0.1 mm thick, were all pre-irradiated with uncollimated fission fragments. Pre-irradiation was carried out using a convertor of fissionable 235U. The 235 U convertor plate was of uniform density and all 19 mica SSTR's were pressed against the surface of the plate during the irradiation with thermal neutrons. Since the thermal neutron irradiation was uniform, an equal number of uncollimated fission fragments were induced onto all the mica SSTR's. One control specimen was set aside and kept at room temperature. The remaining 18 mica SSTR's were subjected to known elevated temperatures for known time periods, each mica SSTR being exposed for a unique period (either 1.5, 3.0 or 6.0 hours) at a unique temperature (either 375, 425, 450, 475, 525, or 575° C.). These conditions are summarized in TABLE III.

TABLE III

MICA CALIBRATION CONDITIONS

| Time (Hours) | Temperatures in Degrees Centigrade (t) |
| --- | --- |
| 1.5 | 375, 425, 450, 475, 525, and 575 |
| 3.0 | 375, 425, 450, 475, 525, and 575 |
| 6.0 | 375, 425, 450, 475, 525, and 575 |

The 18 thermally exposed mica SSTR's together with the control specimen were simultaneously etched in a bath of 48% Hydrofluoric acid (HF) in aqueous solution at room temperature for 90 minutes. After etching, all mica SSTR's were scanned by optical microscopy to observe the track density N. The track shape characteristic D for mica is not readily observed in optical microscopy since etched fission fragment tracks in mica are neither elliptical nor round but tend toward diamond and irregular shape depending on the angle of incidence of the fission fragment. Consequently only track density was observed for the mica calibration.

Figure 8:
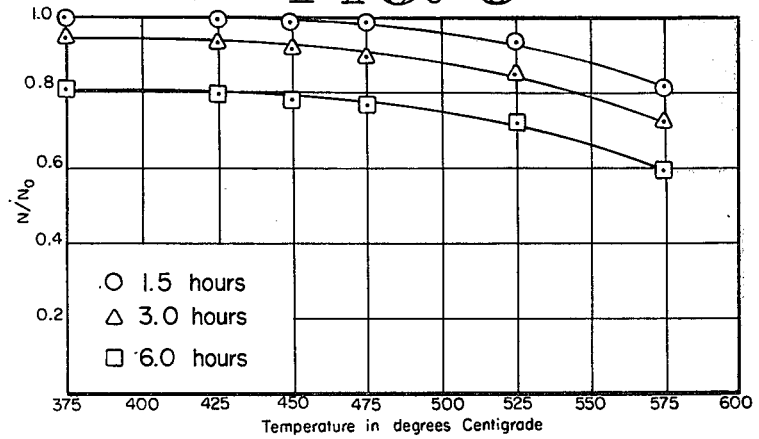
FIG. 8 is a diagram of the functional relationship of track density to attained temperature in an exemplary mica SSTR.

The results of optical microscopic scanning are presented in FIG. 8, which displays the relative track density $N/N_o$ for each temperature $t_n$. Here $N_o$ is the track density observed for the control specimen. This calibration data furnishes an appropriate standard calibration scale which can subsequently be used in applications of mica SSTR's as passive temperature monitors. It should be noted that mica becomes dehydrated above approximately 600° C. Dehydration can deleteriously effect the etching process in mica, so that 600° C. represents an effective upper limit for the use of mica as a passive temperature monitor.

It should be noted that various pre-irradiation techniques and post-exposure processing techniques can be altered for specific application or to emphasize various observed characteristics. For instance pre-irradiation could be performed with particular particles matched to the sensitivity of a particular solid state track recorder. Irradiation might be carried out with varying amounts of beam collimation or at various angles to the recorder surface. Similarly various shielding devices may be used to provide selective radiation or sources generating secondary radiation may be placed immediately adjacent the solid state track recorder so that primary radiation might not effect the recorder surface might generate secondary radiation that will affect the solid state track recorder. Similarly various degrees and conditions of etching of the exposed sensor may change the results of etching especially to enhance particular features. In general my process may be adapted to the various sophistication of the solid state track recording art to take advantage thereof in selectively determining thermal historicity of the recorder.

It should be further noted that the solid state track recorder may be very small, of only a few millimeters or less in size, as commonly used for convenience of handling, marketing and processing. With such devices a number of recorders can be simultaneously used in substantially the same environmental location, as in the nuclear reactor, without perturbing the environment. This allows use of redundant monitors of the same material or of a number of monitors of different materials to provide increase reliability and accuracy and sometimes additional information.

It should be further noted that the materials from which solid state track recorders are commonly formed are such as to be capable of withstanding the harshest of radiation environments such as found in nuclear power reactors or nuclear explosions and these environments will not effect the temperature measure of my process.

It should also be noted that by employing a plurality of sensors according to my invention, data may be obtained concerning the time variation of temperature especially as in observations in a nuclear reactor. The neutron field of the reactor can be used to provide an induced fission fragment or alpha particle irradiation of the solid state track recorder or in a non-reactor application a suitable radiation source can be placed in operative adjacency with the solid state temperature recorder. Using the same observable characteristics one can then provide data related to the time variation of the temperature throughout the history of the monitors exposure in the elevated temperature environment based on the time variance of irradiation.

It is also possible by known methods of functional analysis to determine the functional relationships between the three variables of temperature, time of exposure at that temperature and track physical characteristic to allow determination of attained temperature of a sensor when thermally exposed for a different time than the control SSTR's. This analysis may be carried further to other and additional variables to add great sophistication to my process.

The foregoing description of my invention is necessarily of a detailed nature so that a specific embodiment of my process or method might be set forth as required, but it is to be understood that various modifications of detail, rearrangement and multiplication of steps and procedures might be resorted to without departing from its spirit, essence or scope.

Having thusly described my invention, what I desire to protect by Letters Patent, and what I claim is:

1. A process for determining thermal history of a solid state radiation track recorder comprising, in combination, the steps of:

selecting a group of solid state track recorders and dividing the total group into a sensor set and a control set;

pre-irradiating the total group of solid state track recorders so that each has substantially identical radiation impingement;

exposing the sensor set of solid state track recorders for a period of time at elevated temperatures, sufficient to cause physical change in the areas surrounding the sites of radiation impingement, in the environment under observation;

processing the total group of solid state track recorders under identical conditions to make radiation impingement on their surfaces observable;

measuring at least one physical characteristic of the radiation impingement sites of all solid state track recorders;

comparison of the measured physical characteristics of the radiation impingement sites of the sensor set of solid state track recorders to the same characteristics of the control set of solid state track recorders to determine the relationship and;

comparison of that relationship to a standard calibration scale to determine thermal history of members of the sensor set.

2. The process of claim 1 wherein the standard calibration scale is determined by:

selecting a group of substantially identical solid state recorders;

dividing that total group of solid state track recorders into a first control set and a second measuring set;

exposing all of the total group of solid state track recorders to substantially identical radiation;

exposing each of the pre-irradiated solid state recorders of the measuring set to different temperatures (t) that are accurately known for predetermined periods of time;

processing the total group of solid state track recorders to render radiation impingement damage sites in their surface observable;

measurement of at least one physical characteristic ($N_n$) of the radiation damage sites of each solid state track recorder of the measuring set and the same characteristic ($N_o$) of the control set;

determination of the relationship ($N_n/N_o$) of the measured physical characteristics of each member of the measuring set relative to the control set for each known temperature ($t_n$); and representation of the relationship of measured physical characteristics and temperature in some sensible form.

3. The invention of claim 1 further characterized by the measured physical characteristic of radiation impingement damage sites being areal density of those radiation impingement sites.

4. The invention of claim 1 further characterized by the measured physical characteristic of radiation impingement damage sites being the relative size of those radiation impingement damage sites.

5. A process for determining the maximum historically attained temperature of a solid state radiation track recording device from changes caused by the annealing of radiation impingement damage sites in the recording device surface, comprising, in combination:

selecting of a plurality of substantially identical solid state track recorders that are thermally reactive in the temperature range to be measured and dividing the plurality into a first group of sensors and a second group of controls;

pre-irradiating all of the plurality of solid state track recorders in a substantially identical fashion so that all have statistically identical radiation damage sites;

subjecting the first group of sensors to the temperature environment to be measured for a pre-determined time while maintaining the second group of control sensors below a temperature that has any thermal effect on radiation impingement damage sites therein;

processing all of the plurality of solid state track recorders to render the radiation impingement damages sites in the surfaces thereof observable as tracks; 'measuring the areal density of the tracks in all of the plurality of solid state track recorders;

determining the relationship of the areal density of tracks in the first group of sensors to the areal density of tracks in the second group of controls;

comparing the immediately aforesaid relationship with a pre-determined standard of thermal changes of tracks in similar solid state track recorders to determine the historically attained temperature of the first group of sensor solid state track recorders.

* * * * *